United States Patent [19]

Miller

[11] Patent Number: 5,069,853
[45] Date of Patent: Dec. 3, 1991

[54] METHOD OF CONFIGURING EXTRUDATE FLOWING FROM AN EXTRUDER DIE ASSEMBLY

[75] Inventor: William H. Miller, Wadsworth, Ohio

[73] Assignee: GenCorp Inc., Fairlawn, Ohio

[21] Appl. No.: 479,797

[22] Filed: Feb. 14, 1990

Related U.S. Application Data

[62] Division of Ser. No. 207,838, Jun. 17, 1988, Pat. No. 4,906,171.

[51] Int. Cl.⁵ .................... B29C 47/24; B29C 47/22
[52] U.S. Cl. .................. 264/176.1; 264/177.1; 264/209.2; 264/209.8; 264/285; 264/339
[58] Field of Search ............... 264/209.8, 209.2, 210.1, 264/210.2, 177.16, 209.3, 285, 295, 339, 176.1, 177.1; 425/131.1, 133.1, 145, 376, 380, 381, 325, 403.1, 463–466

[56] References Cited

U.S. PATENT DOCUMENTS

| | | | |
|---|---|---|---|
| 1,618,256 | 2/1927 | Wuthrich | 425/467 |
| 2,062,338 | 12/1936 | Tanzi | 425/467 |
| 3,080,608 | 3/1963 | Van Riper | 425/466 |
| 3,093,860 | 6/1963 | Eilersen | 425/466 |
| 3,345,918 | 10/1967 | Deleuze et al. | 425/465 |
| 3,425,092 | 2/1969 | Jun Taga | 425/380 |
| 3,564,652 | 2/1971 | Baugnies et al. | 425/DIG. 12 |
| 3,761,213 | 9/1973 | Wight | 425/465 |
| 4,025,262 | 5/1977 | Furman | 425/145 |
| 4,293,294 | 10/1981 | Rasmussen | 425/382.3 |
| 4,368,016 | 1/1983 | Zoller | 425/381 |
| 4,455,133 | 6/1984 | Jakob et al. | 264/167 |
| 4,461,738 | 7/1984 | Russell | 264/167 |
| 4,479,768 | 10/1984 | Kube et al. | 425/192 |
| 4,648,821 | 3/1987 | Thulin | 425/133.1 |
| 4,761,129 | 8/1988 | Aste et al. | 425/133.1 |
| 4,832,960 | 5/1989 | Compagnon | 425/131.1 |
| 4,906,171 | 3/1990 | Miller | 425/131.1 |

FOREIGN PATENT DOCUMENTS

| | | | |
|---|---|---|---|
| 2359746 | 12/1972 | Fed. Rep. of Germany. | |
| 2921943 | 12/1980 | Fed. Rep. of Germany | 425/131.1 |
| 2395123 | 2/1979 | France | 264/573 |
| 49-5903 | 2/1974 | Japan. | |
| 58-220717 | 12/1983 | Japan | 425/381 |
| 59-188424 | 10/1984 | Japan | 264/209.8 |
| 87-05258 | 9/1987 | PCT Int'l Appl. | 425/131.1 |

OTHER PUBLICATIONS

Teito Rubber—Advantages of TMS Process.

*Primary Examiner*—Jeffery Thurlow
*Assistant Examiner*—Mathieu Vargot

[57] ABSTRACT

A method is described for bending an extrudate exiting an opening in an die assembly without substantially changing the cross sectional shape of the extrudate. The method includes the step of channeling the flow of extrudate from an extruder through a flow channel and the opening in the die. The opening in the die is rotated with respect to the feed opening to vary the length of the flow channel and pathways along which extrudate flows thereby variably directing flow of the extrudate as the extrudate exits the opening in the die.

6 Claims, 3 Drawing Sheets

ન,069,853

METHOD OF CONFIGURING EXTRUDATE FLOWING FROM AN EXTRUDER DIE ASSEMBLY

This application is a divisional application of Ser. No. 207,838, filed June 17, 1988, now U.S. Pat. No. 4,906,171.

BACKGROUND OF INVENTION

The invention relates to extrusion, especially the dies that are used in the extrusion process which essentially comprises charging solid extrudable material, such as rubber, to the heat chamber of an extruder, after which the material is heated to a flowable state and forced from the chamber through the opening in a plate or die which is mounted at the discharge end of the heat chamber. The extrudate falls onto a conveyor which removes the extrudate from the extruder which, typically, has a horizontally disposed hollow barrel with a cylindrical bore as a heat chamber. A rotatable screw is disposed in the bore for forcing the heated material through the die at the discharge end of the barrel.

Extruded products, such as rubber automobile and refrigerator door seals are limited to linear extruded formations. The corners of such door seals are presently formed, by hand. For example, the ends of two seals are mitered and held together in a mold, after which similar rubber material is injected into the mold to contact and join the mitered ends to form the corner desired. Removable inserts are placed in hollow sections of the mitered ends, so that the shapes of the seals will not be distorted during the corner forming process which is complex, time consuming and expensive.

The aforementioned door seals can be molded with curved or square corners, but this process is a batch-type process which is much slower than the continuous extrusion process. Moreover, expensive molds are required in the molding process. Thus, it is quicker and easier and less expensive to use the extrusion process, if at all possible.

The extrusion of bends in rubber automobile hose is well known. This is accomplished by eccentrically positioning in the flow channel through which extrudate flows, the cylindrical core or mandrel which is used to form the hollow bore within the hose. The variation in the thickness of the flow pathways along the mandrel, causes the rubber extrudate or hose to bend in the direction of the narrower pathway, or thinner sidewall produced in the hose. Such a process is suitable for extrudates which have a relatively simple shape that is substantially symmetrical about an axis. The aforementioned door seals generally have a complex geometry or shape, so that their formation is incompatible with the hose making process.

A simple, revolutionary way has been discovered to bend or curve a uniform extrudate without radically distorting the shape of the extrudate.

Briefly stated, the invention is in a method and apparatus for substantially varying the length of the pathways which extrudate flows to opposing extremities of a die opening to produce bending or curvature of the extrudate in the direction of the longer pathway.

It has been found that varying the lengths of the flow pathways, rather than the thickness nf the pathways, causes the extrudate to bend without substantially changing its cross sectional shape. Thus, the invention has the advantage of producing a more uniform product which does not have any of its sidewalls weakened by a reduction in thickness.

DESCRIPTION OF DRAWING

The following description of the invention will be better understood by having reference to the accompanying drawing, wherein.

DETAILED DESCRIPTION OF THE DRAWING

Figure 1:
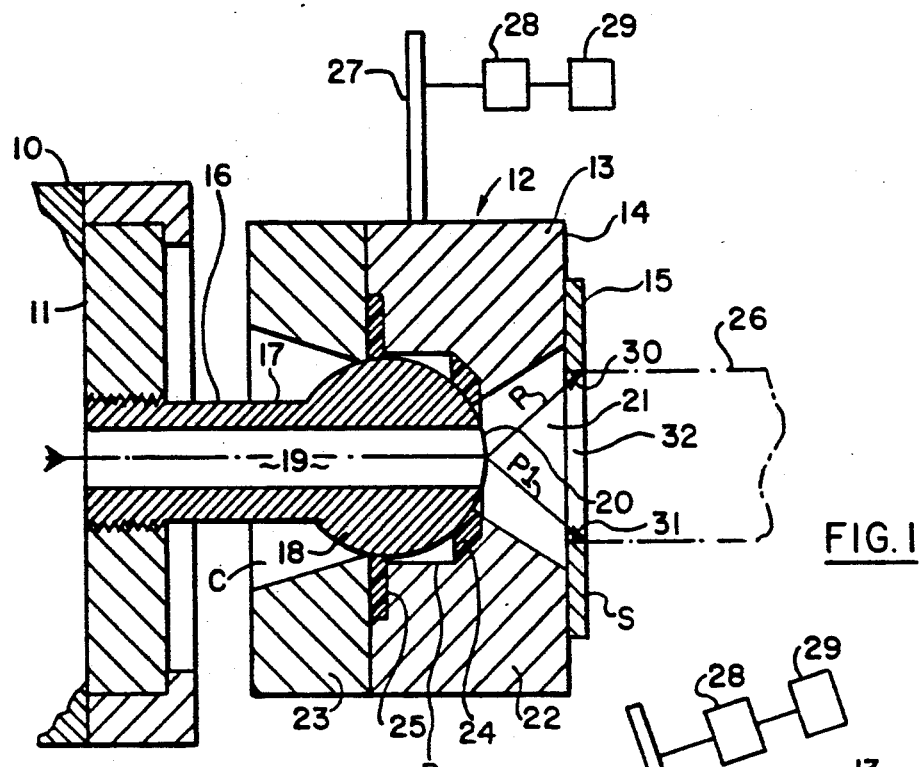
FIG. 1 is a cross section of a die assembly which is made in accordance with the invention, and includes a schematic of components for rotating the die assembly which is shown in an unrotated position.
Figure 2:
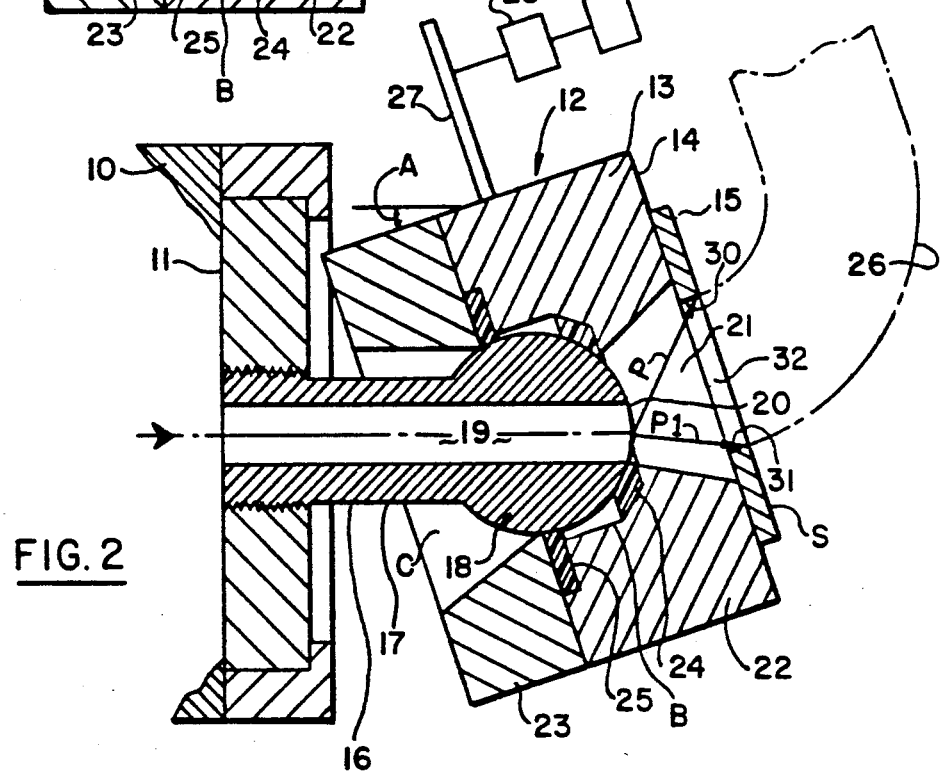
FIG. 2 is a similar cross section showing the die assembly in a rotated position.

With general reference to the drawing for like parts and particular reference to FIGS. 1 and 2, there is shown an extruder 10 with a metal front plate or head 11 to which a metal die assembly 12 is mounted. The die assembly 12 essentially comprises, a swivel socket or die head 13 which has a front face 14 to which any suitable die 15 is fastened, and a stationary ball-type nozzle 16.

The nozzle 16 comprises an elongated cylindrical portion 17 which is threadably secured to the front plate 11 of the extruder 10 and which terminates at a spherical or ball-shaped distal end or tip 18. A cylindrical feed channel or passageway 19 extends longitudinally through the nozzle 16 and terminates at a feed opening 20 at the discharge end of the fixed nozzle 16. Extrudate flows from the extruder 10 through the feed channel 19 and feed opening 20 into a frustco-conically shaped flow channel 21 of the socket 13, the conical sides of the flow channel 21 diverging in a direction away from the feed opening 20. The flow channel 21 having a longitudinal central die axis 21A is conically shaped to accommodate a number of dies while minimizing the dead areas adjacent the front face 14 of the socket 13, and to permit maximum rotation of the socket 13 without blockage of the feed opening 20.

The socket 13 is comprised of two rectangular plates 22, 23 which are bolted together around the ball tip of the nozzle 16. The die 15 is fastened to the outer face 14 of the front plate 22 in which the flow channel 21 is formed. A rearwardly facing frusto-conically shaped cavity C is formed in the back plate 23 in spaced concentric relation with the flow channel 21, to allow the necessary rotation of the socket 13, e.g. angle A of 15 degrees, relative to the longitudinal axis of the feed channel 19. The socket 13 is also rotatable 360 degrees around the feed channel axis. A generally cylindrical bore B is also formed in the front plate 22 in concentric relation with the flow channel 21 and connects the flow channel 21 and rear cavity C. The bore B is also designed to receive a pair of any suitable seals, e.g. parallel, nylon annular seals 24, 25 to prevent the flow of extrudate 26 anywhere but in the flow channel 21.

It can be appreciated that any suitable guide means (not shown) can be provided for limiting rotation of the socket 13 in any desired plane or direction. Further, any appropriate means can be used to rotate the socket 13 in such plane or direction. For example, the socket 13 can be provided with an outstanding arm or handle 27 which a skilled operator can use to rotate the socket 13 to produce the desired bend or curvature in the extrudate 26. For more sophisticated operations, the arm 27 can be coupled to one or more hydraulic actuators 28 which rotate the socket 13 in correlated relation to a pattern or to commands received, for example, from a computer 29 which is programmed to produce the desired product, e.g. a rectangular door seal with curved or rounded corners.

The invention is in varying lengths of the pathways P and P1, along which the extrudate 26 travels through the flow channel 21 and die 15 to opposing extremities, e.g. sides 30, 31, of the opening 32 in the die 15, sufficiently to cause the extrudate 26 to bend as it exits the flow channel 21 and die 15. For example, as seen in FIG. 1, the flow pathways P and P1 to opposing sides 30, 31 of the opening 32 in the die 15, are substantially equal so that the extrudate 26 will pass from the die 15 in a straight line or horizontal plane when the die assembly 12 is horizontal. Notice in FIG. 2 the difference, in length, of the same pathways P and P1 when the socket 13 is rotated upwards from the horizontal, 15 degrees which is sufficient to cause the extrudate to bend upwards towards the longer pathway P and away from the shorter pathway P1 in accordance with the invention.

Figure 3:
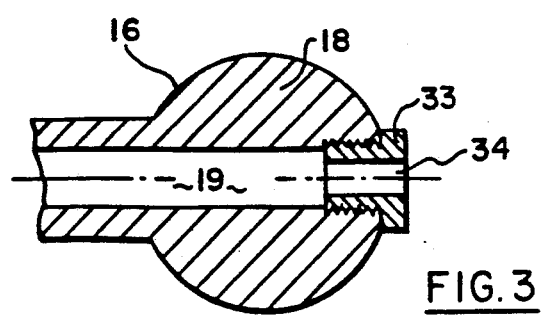
FIG. 3 is a cross section of the ball tip of the die assembly, showing a removable coupling for changing the nozzle through which extrudate flows towards the die.

If necessary, the size of the feed opening 20 or length L (FIG. 9) of the flow channel 21 can be changed by threadably inserting in the feed opening 20, a coupling 33 with or without a smaller diameter feed channel 34, as best seen in FIG. 3.

For the foregoing described embodiment of FIGS. 1 and 2, the die assembly 12 utilized a fixed, ball-type nozzle 16 and a swivel or rotatable socket 13. The following described embodiment employs a fixed socket 13 and a rotatable nozzle 16 to vary the length of the flow pathways P and P1 and achieve bending of the extrudate 26.

Figure 4:
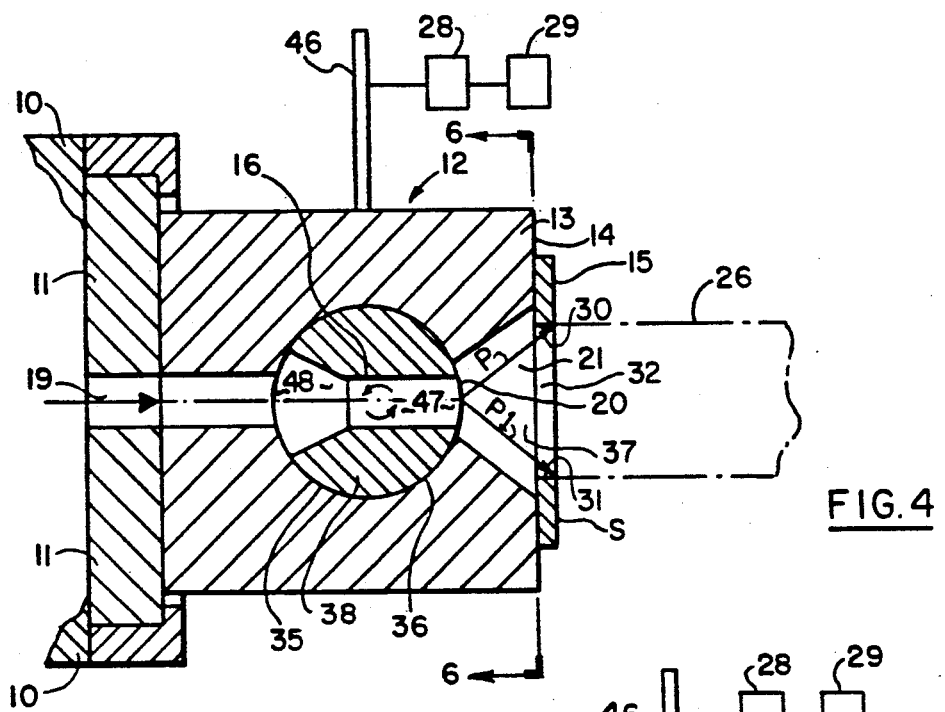
FIG. 4 is a cross section of a second embodiment of the die assembly in an unrotated position as viewed from the line 4—4 of FIG. 6.
Figure 5:
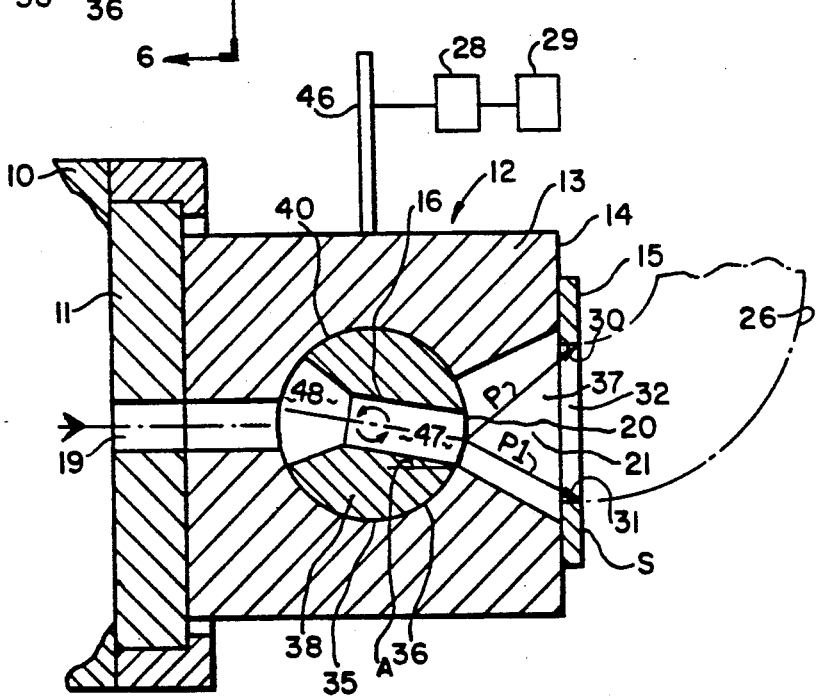
FIG. 5 is a similar cross section of the second embodiment, showing the die assembly in a rotated position.
Figure 6:
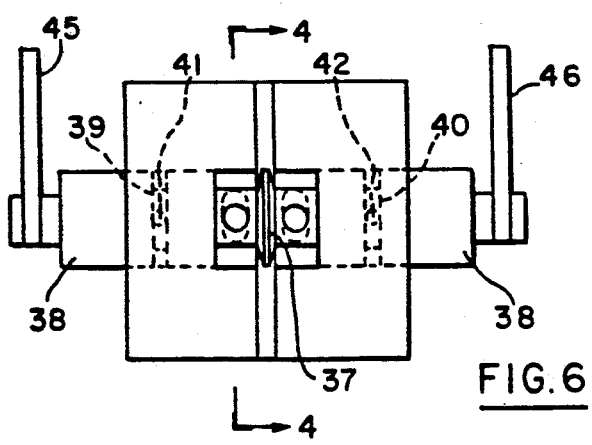
FIG. 6 is a front view of the second embodiment of the die assembly as seen from the line 6—6 of FIG. 4.

With reference to FIGS. 4-6, the socket 13 of the die assembly 12 is a solid, stationary block which is secured to the front extruder plate 11, while the nozzle 16 is rotatable within a bushing 35 that lines a cylindrical bore 36 which is disposed crosswise in the socket 13, i.e. the longitudinal axis of the bore 36 is normal to the longitudinal axis of the feed channel 19 which is now located in the socket 13 in axial spaced relation from the flow channel 21 which is just behind the die 15. Thus, the nozzle 16 and not the socket 13, rotates in a vertical plane about a horizontal axis when the die assembly 12 is properly positioned on the extruder 10.

In this particular instance, the die assembly 12 is designed for dual extrusion of, for example, two extrudates of different materials. Accordingly, the die assembly 12 is provided with two separated feed channels 19 that are in communication with two axially spaced similarly shaped and separated flow channels 21 via twin nozzles 16 that can be mounted for selective rotation, or unitary rotation, depending on the result desired. The twin flow channels 21 flare outwardly towards the die 15 and are side-by-side, being separated by a vertically disposed divider plate 37 which is tapered to bring the two extrudates together as they enter the die opening 32.

The twin nozzles 16 are formed in transverse, parallel relation in a solid cylinder 38 which is mounted in the bushing 35 for rotation about the longitudinal axis of the bore 36. A pair of annular recesses 39, 40 are formed in the cylinder 38 to receive any suitable means, e.g. set screws 41, 42, coacting with the fixed socket 13, to prevent axial movement of the cylinder 38 and maintain it in position within the bore 36 of the fixed socket 13, especially if the cylinder 38 is equally split longitudinally to allow selective rotation of the twin nozzles 16. In such case, the split cylinders and nozzles 16 would be provided with separate handles 45, 46 for rotating the twin nozzles 16 separately or, in unison, if desired. The twin handles 45, 46 can be operated manually, or as previously mentioned, operatively coupled to hydraulic actuators 28 and computer 29. The twin nozzles 16 each include an elongated, cylindrical discharge passageway 47 which terminates at the feed opening 20 or entry into the flow channel 21, and a rearwardly flaring intake opening 48 which confronts the feed channel 19. The intake openings 48 are flared to accommodate rotation of the nozzles 16, i.e. to maintain the feed channels 19 and flow channels 21 in communication during rotation of the twin nozzles 16.

Figure 7:
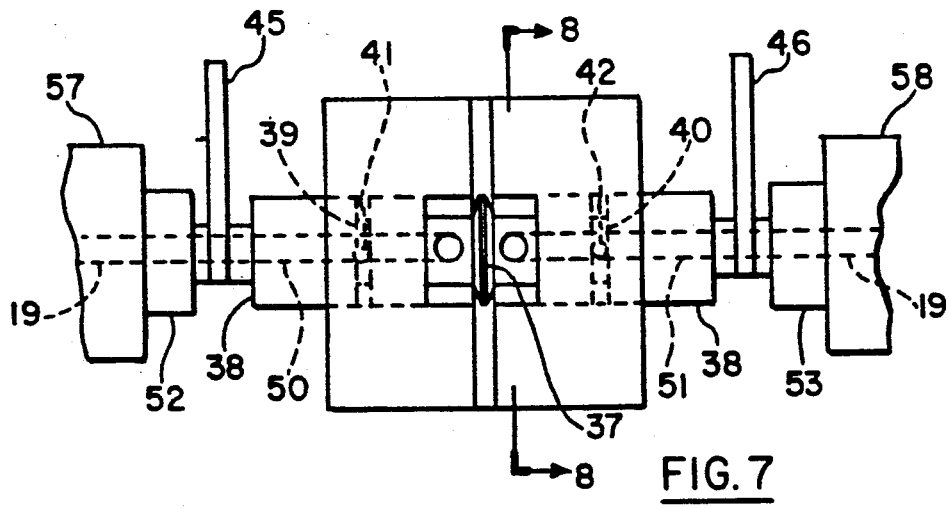
FIG. 7 is similar to FIG. 6, but of a different embodiment of the die assembly.
Figure 8:
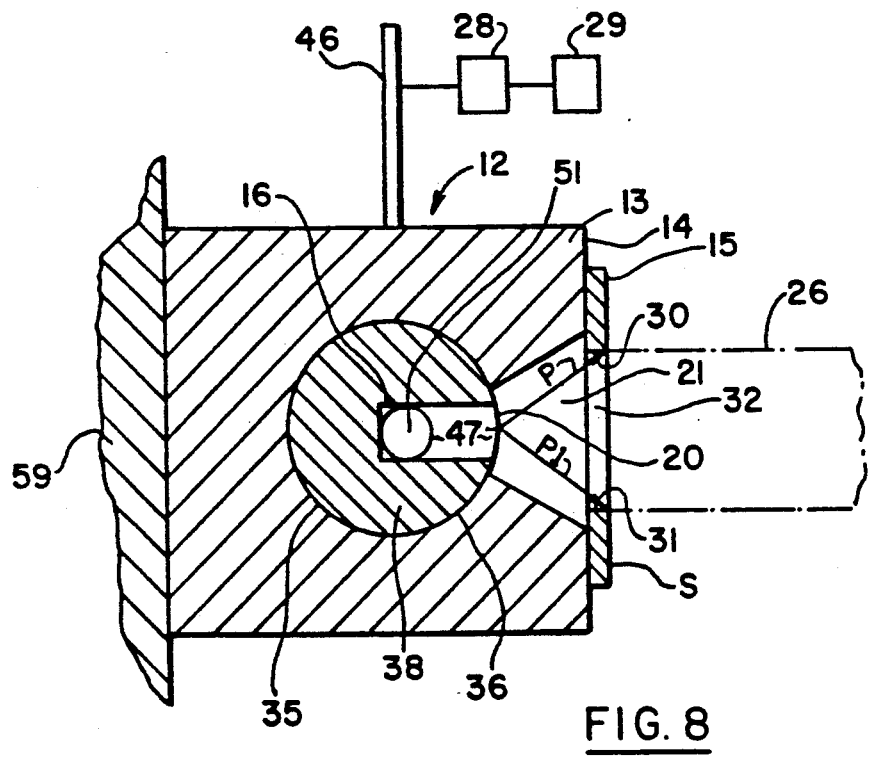
FIG. 8 is a section viewed from the line 8—8 of FIG. 7.

With reference to FIG. 7 and 8, the single or twin cylinders 38 are provided with a pair of centrally disposed, axially spaced bores or feed channels 50, 51 which communicate with the associate twin discharge passageways 47 in place of the twin feed channels 19 and flared intake opening 48 of the previously described embodiment. A pair of rotatable collars 52, 53 are provided between the exposed outer ends of the twin cylinders 38 and a pair of confronting, stationary extruders 57, 58 so that the single or twin nozzles 16 can be rotated relative to the extruders 57, 58 and the socket 13 which is mounted in stationary relation to the rotatable nozzles 16 by any suitable means, e.g. framework 59 which can be mounted between the extruders 57, 58 or on a floor on which the extruders are mounted.

Alternately, any suitable means can be used to mount a socket 13 and nozzle 16 of FIGS. 7 and 8 on an extruder, so that they can be rotated together, or the nozzle 16 can be rotated independently of the socket 13. This particular combination is beneficial when the socket 13 and nozzle 16 are adapted to rotate in a horizontal plane to produce, for example, a rectangular door seal which can be conveniently deposited on a horizontally moving conveyor as the seal is formed.

The aforementioned die assemblies 12 can be advantageously used to correct unwanted curvature in an extrudate caused by imperfections in the die or complex cross-sections of the extrudate. For example, the tendency of an extrudate to curve downwards from the horizontal could be compensated for by rotating the die 15 upwards to a correcting position, as shown in FIG. 2.

Further, it has been found that holding the die assemblies 12 in a rotated position for a period of time causes the extrudate to coil like a spring. This is useful in winding-strips around spherical or conically shaped mandrels, such as the winding of rocket insulation around the cap of a closed pressure vessel. At present, it is necessary for the strips to stretch and overlap in the region of the spherical caps. The die assemblies 12 can be programmed to produce a continuously varying radius of curvature to facilitate the winding of a hemispherical cap or other curved surface. These and other advantages of the invention will become apparent from the following technical discussion of the invention.

The extrudate velocities at different locations on the face of the die 15 vary inversely with the lengths of their flow pathways. In FIG. 2, the higher velocity at die opening side 31, relative to die opening side 30, results from the shorter flow pathway PI relative to the longer flow pathway P. This difference in velocity at the die opening results in either a curved extrudate or local stretching and/ or buckling, if the extrudate is restrained from curving.

Generally, velocities through local regions of the die opening 32, such as at sides 30 or 31, vary inversely with the corresponding total resistances to flow between the outer surface S of the die 15 and the feed opening 20 of the nozzle 16. The total resistance is the sum of the resistance to flow through the flow channel 21 and the resistance to flow through the die opening 32. Accordingly, the ability of the die assembly 12 in FIG. 2 to produce curved extrudate, is related to the ability of the die assembly to change the ratio of the total flow resistance along the shorter flow pathway PI to the total flow resistance along the longer flow pathway P.

It is important to keep the resistance to flow through he opening 32 of the die 15 as low as possible, because two resistance increases the effectiveness of the die assembly 12 in ending extrudate. this can be accomplished, for example, by decreasing he thickness of the die 15 and/or tapering the opening 32 of the die 15, so that the opening of the rear face of the die, closest the flow channel 21, is larger than he opening at the outer exposed front face of the die farthest from eh flow channel 21.

The geometry of a die assembly should be designed to give the following three performance characteristics:

I. The die assembly should be able to produce bends in he extrudate with any desired angle and radius of curvature ranging from an acute enclosed angel (less than 90°) with a small radius of curvature, e.g. 1 inch, to long straight sections in order to produce presently known geometric shapes.

II. The ratio of the flow pathway length leading to a particular location on the rotated die o the corresponding flow pathway length for the unrotated or neutral die should change monotonically (no local maxima or minima) across the face o the die. Accordingly, the velocity exiting the rotated die, relative to the corresponding velocity of the extrudate for the unrotated die, should have no maximum or minimum across the face of the die in order to produce a curved extrudate with minimal stretching or buckling and/or change in cross sectional shape of the extrudate. Ideally the velocity should vary linearly across the face of the die.

III. The ratio of the longer o the shorter flow pathway lengths (P/P1) for any pair of extrudate sections emerging equidistant from the center of the die should increase with increasing rotation angle A of the die to insure that increasing the angle A of rotation will not result in a decrease in curvature of the extrudate.

Figure 9:
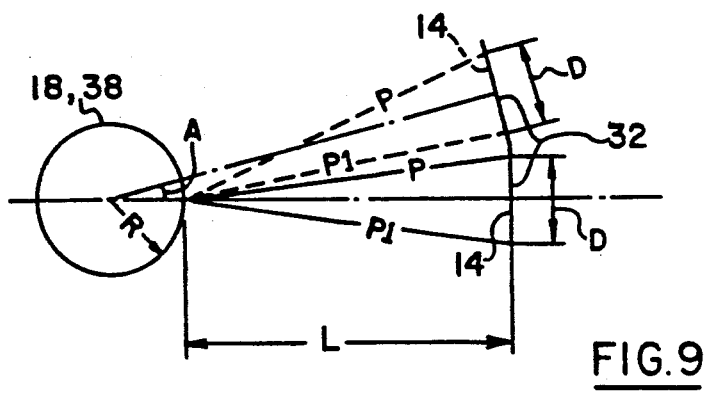
FIG. 9 is a schematic of certain geometric variables of the different die assemblies.

A geometric analysis of the invention based on FIG. 9 indicates that, as to characteristic I above, the ability of the die assembly to bend extrudate for a given D/R value increases as the ratio L/R deceases, L being the length of the flow channel 21, measured axially along he channel between the feed opening 20 and the die 15 when the die is unrotated or in the neutral position (FIGS. 1 and 4), D being the maximum distance across eh opening 32 of the die, e.g. the distance between sides 30, 31 of FIG. 1, and R being the radius of the ball-shaped tip 18 (FIG. 1), or of the cylinder 38 (FIG. 4). See FIG. 9 also.

Further, the analysis indicates that characteristic II is better satisfied as the ratio of D/2L decreases, L being the length of the flow channel 21. The analysis shows the preferable range of D/2L values decreases as the ratio L/R decreases and as the angle A increases.

To satisfy characteristic III, the analysis indicates that each value of L/R has associated with it a preferable range of rotation angles A for which the ratio of the lengths of the flow pathways (P/P1) increases with increasing rotation angle A. The preferable range of angle A decreases with decreasing L/R ratio.

It is apparent from the foregoing analysis that the design of directed flow die assemblies involves tradeoffs between the effectiveness of the assembly in inducing curvature (characteristic I), the preservation of extrudate cross section (characteristic II), and increasing curvature with increasing rotation angle (characteristic III), because characteristic I is accomplished by lowering the L/R ratio, whereas characteristics II and III place increasing restrictions on i) the rotation angle A as L/R is decreased, and ii) the die opening width ratio D/2L as L/R and A are decreased.

The included angle between adjacent straight sections between which the corner is formed and the radius of curvature of the corner or the roundness of extruded corner are functions of the rotation angle A and time. For example, using the die assembly 12 of FIG. 1, a 90° bend or corner with a small uniform radius of curvature is formed by rotating the socket 13 fifteen degrees from the neutral position of FIG. 1 as quickly as possible, leaving it in the rotated position for a short period of time, and then rotating it back to to the neutral position as quickly as possible. The same 90° bend with a larger radius of curvature is formed by rotating the socket 13 quickly five degrees from the neutral position, holding the socket 13 in the rotated position for a period of time sufficient to form the 90° bend or corner, and then rotating the socket back quickly A coiled spring-like extrudate is formed by holding the socket 13 in the rotated position for a longer period of time, the tightness of the coils being dependent on the angle A at which socket 13 is initially rotated. It can be appreciated that an extrudate with a compound curvature can be formed by varying the rotational angle A of the socket 13 uniformly or otherwise over a period of time.

Thus, there has been described a unique die assembly for placing bends in an extrudate without adversely distorting the cross sectional space of the extrudate as it is being bent or curved. The complexity of the geometric shape of the extrudate seems to present no particular problem in the bending of the extrudate using the die assembly. The simplicity of design makes the die assembly readily adaptable to meet continuous extrusion devices and obviates the need for more expensive and time consuming molding operations.

The foregoing parameters of the invention have been described, so that a die assembly of the invention can be designed for use with a particular die now being used in production. It is believed that any modifications or additions to the invention should be readily apparent from the above description.

What is claimed is:

1. A method of bending an extrudate exiting an opening in a die comprising:
   a) channeling the flow of extrudate from an extruder through the die, mounted on the extruder, via a flow channel of the die and the opening in he die; and
   b) rotating the opening in the die with respect to a feed opening to the flow channel to vary the length of the flow channel and pathways along which extrudate flows thereby variably bending the extrudate as the extrudate exits the opening in the die.

2. The method of the claim 1, wherein channeling the flow of extrudate includes directing the flow of extrudate successively through a feed opening and flow channel just prior to entry of the extrudate in the opening of the die.

3. The method of claim 2, wherein the length of the flow channel and always along which extrudate flows is measured from the feed opening to the opening in the die on the outer, exposed face of the die farthest from the feed opening, said length of the flow channel and pathways being varied by causing relative movement between the feed opening and the opening in the die.

4. The method of claim 3, wherein causing relative movement between the feed opening and flow channel includes rotating the flow channel in relation to a stationary feed opening.

5. The method of claim 3, wherein causing relative movement between the feed opening and flow channel includes rotating the feed opening in relation to a stationary flow channel.

6. A method of bending extrudate flowing from an extruder die assembly, comprising the steps of:
   a) supplying extrudate from an extruder to a feed passage having a feed opening and a central feed axis extending longitudinally of said feed passage and feed opening;
   b) supplying extrudate from said feed opening to a die head having a passage communicating with said feed opening and a front surface;
   c) supplying extrudate to a continuous pathway defined by said feed opening and die head passage, aid pathway having a central die axis extending longitudinally of said pathway;
   d) moving said die and feed axes with respect to one another by rotating said die head passage or feed opening with respect to the other of said feed opening or die head passage, respectively to thereby vary the length of said pathway, and
   e) bending extrudate exiting from the assembly, corresponding to the movement of the axes with respect to one another.

* * * * *

UNITED STATES PATENT AND TRADEMARK OFFICE
CERTIFICATE OF CORRECTION

PATENT NO. : 5,069,853
DATED : December 3, 1991
INVENTOR(S) : William H. Miller

It is certified that error appears in the above-indentified patent and that said Letters Patent is hereby corrected as shown below:

Column 7, line 8 delete "he" therefor insert --the--.
Column 7, line 15 delete "the" at the first occurrence.
Column 7, line 21 delete "always" and therefor insert --pathways--.
Column 8, line 17 delete "aid" therefor insert --said--.

Signed and Sealed this

Twentieth Day of July, 1993

Attest:

MICHAEL K. KIRK

Attesting Officer        Acting Commissioner of Patents and Trademarks